Jan. 25, 1944.  C. A. CASTELLAN  2,339,766
STAPLE FIBER CUTTER
Filed Jan. 13, 1943
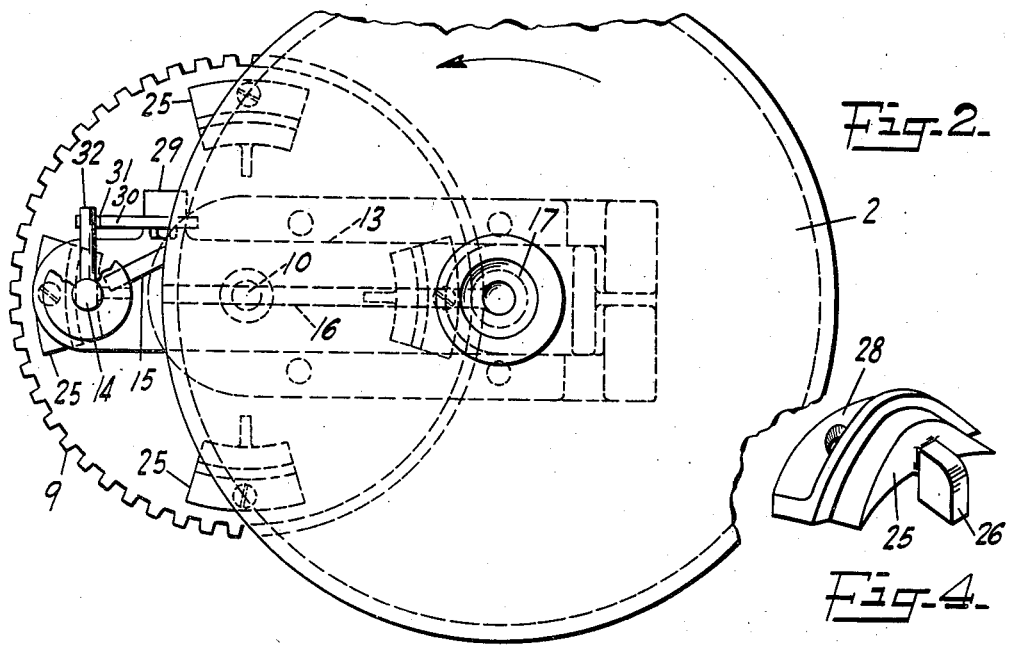
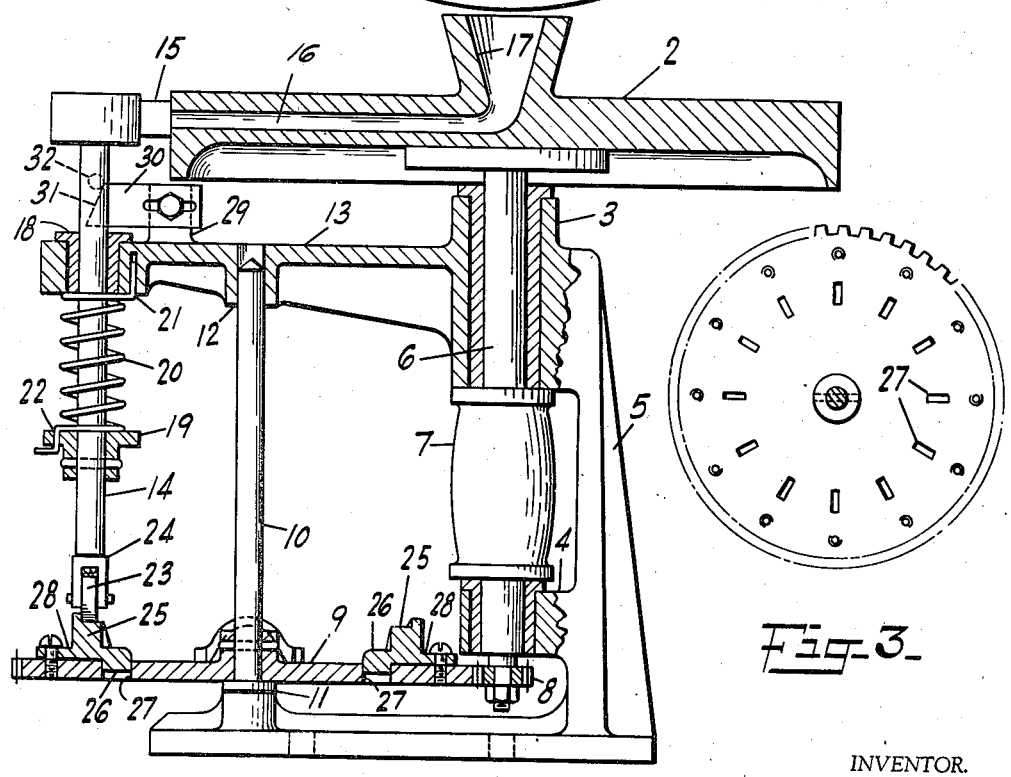
INVENTOR.
CARL A. CASTELLAN
BY Thomas R. O'Nally
ATTORNEY.

Patented Jan. 25, 1944

2,339,766

UNITED STATES PATENT OFFICE 2,339,766

STAPLE FIBER CUTTER

Carl A. Castellan, Wilmington, Del., assignor to American Viscose Corporation, Wilmington, Del., a corporation of Delaware Application January 13, 1943, Serial No. 472,186

8 Claims. (Cl. 164—34)

This invention relates to improvements in staple fiber cutters and is more particularly concerned with an improvement in the invention disclosed in my copending application Serial No. 462,912, filed October 22, 1942.

As pointed out in the above-mentioned patent application, that invention is concerned with cutters in which the filamentary bundle or tow is fed transverse of a cutting plane or shearing surface, such as by passage through a suitable opening in a member, hereinafter generically referred to as the "shear member" or "shear plate," adapted to support the tow in or bring the tow into, cutting relationship with the knife and in which there is continuous relative motion between the shear member and the knife so that the knife is brought into juxtaposition in cyclically recurring succession with the cutting and non-cutting portions respectively of the shear member. Cutters of this character are illustrated in Beria Patent 1,723,998 and Blaschke 2,182,193. In such cutters, the knife bears constantly against the shear member even when not actually cutting. It was the object of the invention described in the above-mentioned patent application to remove the knife from contact with the shear member during most of the non-cutting portion of each cycle of relative movement between the knife and shear member so that a proportional decrease in the wear of the knife and in the power consumption needed to drive the movable member of the cutter may be obtained.

It is also an object of the present invention to prevent the knife from wearing as a result of contact against the shear member during most of the time when the non-cutting portion of the shear member is juxtaposed to the cutting member. However, the present invention goes much further in that it provides in cutting devices of the general type specified above an arrangement by which the cutting member is normally withheld out of contact with the shear member and out of the path of the filamentary material and in which means is provided for interposing the knife in effective cutting relationship with the shear member as often as the cutting portion of the shear member is juxtaposed to the knife during the cyclical relative motion between the two members, or selectively to interpose the knife into cutting relationship only once in several such juxtapositions, or, in the latter case, to so control the interpositions that they occur at any desired regular or irregular interval. In accordance with this invention, means are provided for obtaining any desired frequency of cutting, whether regular or irregular, without changing the periodicity of the above-mentioned cyclic relative movement between the knife and the cutting and non-cutting portions of the shear member. The invention thus makes it possible to obtain staple fiber products made up entirely of any selected single staple length or comprising any desired mixture of various lengths within wide limits without changing the above-mentioned cyclic relative speed between the knife and the shear member. Further objects and advantages of the invention will be apparent from the description of the invention hereinafter.

In the drawing, illustrative of the invention,

Figure 1 is an elevation, partially in cross-section of a preferred embodiment of the invention, Figure 2 is a plan view of the embodiment of Figure 1, Figure 3 is a plan view of a modification of one part of the invention, Figure 4 is a perspective view of a detail.

The invention is illustrated in Figures 1 and 2 in which the cutter head or rotating disc 2 is mounted in suitably spaced bearings 3 and 4 within an upright support 5. The shaft 6 upon which the cutter head 2 is mounted is supplied with a sheave 7 by which it may be driven. The other end of the shaft 6 is provided with a suitable pinion 8 adapted to mesh with a gear wheel 9 which is rotatably mounted on a shaft 10 carried by a step bearing 11 and an upper bearing 12 in an arm 13 extending from the support 5. The arm 13 carries at its outermost extremity a post or rod 14 carrying the knife 15 which is adapted to co-act with the cutter head 2 to cut off that portion of the filamentary material which is conducted outwardly from the radial channel 16 which connects with the customary axial channel 17 adapted to admit the filamentary bundle or tow to the cutter head 2. The continuous feeding of the filamentary material may be effected by the centrifugal force generated by rotation of the disk. If desired, the centrifugal force may be supplemented, or rendered relatively insignificant by a blast of fluid, such as a jet of water or air directed into the axial channel 17, to feed the filamentary material through the disk 2.

A knife-supporting rod 14 is mounted by a suitable bushing 18 within the arm 13 for rotation and reciprocation therein. At a point below this bearing in the arm 13, the rod 14 is provided with a collar 19 which is fixedly secured thereto. A spring 20 has one of its ends secured within the arm 13 at 21 and the other end within the collar 19 at 22 so that it normally tends to force the collar 19 with the rod 14 downwardly and in a clockwise direction with respect to the arm 13 (as viewed in Figure 2). The knife-supporting rod 14 is provided at its foot with a roller 23 which is supported in a yoke 24 rotatively mounted in the end of the rod. The roller 23 is adapted to serve as a cam follower and ordinarily rolls upon the gear wheel 9 which rotates beneath it. The gear wheel 9 is adapted to receive interchangeable, detachable and replaceable risers or cam buttons 25 at any desired spaced intervals thereabout. These risers 25 may be adapted to be secured to the gear wheel 9 in any manner desired. As shown in Figures 1 and 4, the riser 25 is provided with a depending heel portion 26 adapted to fit into the slot 27 within the gear wheel 9 and with a flange 28 which is adapted to receive a cap or machine screw which secures it to the gear wheel 9.

An upright projection 29 is provided upon the arm 13 and carries adjustably mounted thereupon a member 30 having an inclined surface 31 upon which the pin 32 extending from the knife-supporting rod 14 is adapted to ride.

Assuming for the purposes of the description of the operation of the device of Figures 1 and 2 that gear wheel 9 has 12 times as many teeth as the pinion 8 meshing with it, it will be seen that for each revolution of the cutter disk 2, the gear wheel 9 will make $\frac{1}{12}$ of a revolution. The positioning of the maximum point of rise in the cams 25 is so correlated with respect to the radial channel 16 of the cutter head 2 that when it causes the maximum rise of the knife 15, the knife will be in juxtaposition to the open end of the radial channel 16. Since four cam risers or buttons 25 are shown in Figures 1 and 2, and since they are equally spaced about the periphery of the gear wheel 9 it will be readily apparent that the knife 15 will be brought into cutting position only once in three revolutions of the cutter head 2. It is thus possible to obtain a length of staple fiber which is three times the length that would otherwise be obtained where cutting is effeced at every revolution of the cutter head 2 for a given speed of revolution of the cutter head. It will be noted that every time the knife 15 is dropped out of the path of the filamentary material extending from the cutter head 2, the pin 32 is forced by the inclined surface 31 of cam member 30 to swing the knife 15 in a direction counter-clockwise as viewed in Figure 2 away from contact with the cutter head 2. Conversely, at every rise of the knife-supporting rod 14, the spring 20 forces the knife 15 in a clockwise direction into effective cutting contact with the cutter head 2.

The gear wheel 9 may be provided with slots 27 and screw holes at any desired intervals. For example, in Figure 3, they are shown spaced apart by $\frac{1}{12}$ of a complete circle. If cam risers 25 were to be placed at each of these intervals, cutting could be obtained at every revolution of the cutter head. On the other hand, cutting may be caused to take place on every second, every third, every fourth, every sixth, or at every twelfth revolution merely by placing six, four, three, two or one respectively of the cam risers 25 at equidistant intervals about the gear wheel 9. Similarly, any desired combination of different length fibers may be obtained in a single batch by placing two or more cam risers about the gear wheel with different spaces therebetween.

The pinion 8 and gear wheel 9 may be replaced with other pairs having a different ratio. For example, instead of 12 to 1, a ratio of 16 to 1 or 20 to 1 or 9 to 1 or any other desired ratio may be employed. The gear wheels in such combinations may be provided with as many cam receiving positions as indicated by the ratio between the teeth in the gear wheel to that in the pinion, and as stated above, any number of cam risers may be attached, whether equally or unequally spaced about the gear wheel.

From the description hereinabove, it will be seen that the invention provides an improved form of staple fiber cutting apparatus in which, for a given speed of cutter head, any desired length of staple fiber may be obtained or a staple fiber product containing any predetermined mixture of various lengths may be obtained in a simple manner. At the same time, the invention provides for the periodic interposition of the knife at the desired intervals, whether regular or irregular, in operative cutting relation with respect to the cutter head or shear member. Furthermore, the invention provides means for preventing wearing contact of the knife against the shear member except when necessary to effectuate cutting.

The invention may be applied to each of a plurality of knives associated with the cutter disk, whether such knives are distributed equidistantly or non-equidistantly about the cutter head and the staple fibers produced by the cutting action of each knife may be directed into separate containers or they may be combined to produce a mixed length product as desired.

While preferred embodiments of the invention have been disclosed, the description is intended to be illustrative only and it is to be understood that changes and variations may be made without departing from the spirit and scope of the invention as defined by the appended claims.

I claim:

1. In a cutting device comprising a cutting member, a shear member having at least one portion adapted to serve as a cutting base in cooperation with the cutting member and having at least one portion not so adapted, means for imparting continuous motion to one only of the members relative to the other to effect cyclical juxtaposition of the cutting and non-cutting portions of the shear member with respect to the cutting member, and variable control means for effecting intermittent cutting at pre-selected times of the cyclical juxtaposition of the cutting portion of the shear member with respect to the cutting member, the combination therewith of means for bringing the cutting member into contact with the shear member substantially only about the pre-selected times of cutting.

2. In a cutting device comprising a cutting member, a shear member having at least one portion adapted to serve as a cutting base in cooperation with the cutting member and having at least one portion not so adapted, means for imparting continuous motion to one only of the members relative to the other to effect cyclical juxtaposition of the cutting and non-cutting portions of the shear member with respect to the cutting member, and variable control means for effecting intermittent cutting at pre-selected times of cyclical juxtaposition of the cutting portion of the shear member with respect to the cutting member, the combination therewith of means for separating the cutting member from contact with the shear member during the non-cutting periods of juxtaposition of the cutting portion of the shear member with respect to the cutting member and during a substantial part of the periods of juxtaposition of the non-cutting portion of the shear member with respect to the cutting member.

3. In a cutting device comprising a cutting member, a shear member having at least one portion adapted to serve as a cutting base in co-operation with the cutting member and having at least one portion not so adapted, means for imparting continuous motion to one only of the members relative to the other to effect cyclical juxtaposition of the cutting and non-cutting portions of the shear member with respect to the cutting member, and variable control means for effecting intermittent cutting at pre-selected times of cyclical juxtaposition of the cutting portion of the shear member with respect to the cutting member, the combination therewith of cam means for separating the cutting member from contact with the shear member during the non-cutting periods of juxtaposition of the cutting portion of the shear member with respect to the cutting member and during a substantial part of the periods of juxtaposition of the non-cutting portion of the shear member with respect to the cutting member.

4. In a device for cutting a filamentary bundle to discontinuous lengths, a rotatable shear member arranged to discharge the filamentary bundle outwardly from its axis, means for rotating the member, at least one knife arranged adjacent the periphery of the shear member, means for periodically moving the knife into and out of the path of the outwardly extending bundle, means for bringing the knife into effective cutting relationship with the shear member when moved into the path of the filamentary bundle and for separating the knife from contact with the shear member when moved out of the path.

5. In a device for cutting a filamentary bundle to discontinuous lengths, a rotatable shear member arranged to discharge the filamentary bundle outwardly from its axis, means for rotating the member, at least one knife arranged adjacent the periphery of the shear member, means for reciprocating the knife into and out of the path of the outwardly extending bundle, means for swinging the knife into effective cutting relationship with the shear member upon reciprocation into the path of the bundle and means for swinging the knife to separate it from contact with the shear member upon reciprocation out of the path.

6. In a device for cutting a filamentary bundle to discontinuous lengths, a rotatable shear member arranged to discharge the filamentary bundle outwardly from its axis, means for rotating the member, at least one knife arranged adjacent the periphery of the shear member, cam means for reciprocating the knife into and out of the path of the outwardly extending bundle, resilient means for swinging the knife into effective cutting relationship with the shear member upon reciprocation into the path of the filamentary bundle and additional cam means for swinging the knife to separate it from contact with the shear member upon reciprocation out of the path.

7. In a device for cutting a filamentary bundle to discontinuous lengths, a disk having an axial channel for receiving the bundle connected to a radial channel for feeding the bundle outwardly therefrom, means for rotating the disk, at least one knife arranged adjacent the periphery of the disk, a reciprocable and rotatable support for the knife, rotatable cam means operatively connected to the disk rotating means arranged to effect reciprocation of the knife support to move the knife into and out of the path of the filamentary bundle, resilient means for rotating the support to swing the knife into effective cutting relationship with the disk, and additional cam means arranged to permit operation of the resilient means to swing the knife into cutting position upon reciprocation of the knife into the path of the bundle and to swing the knife out of contact with the disk upon reciprocation of the knife out of the path of the bundle.

8. In a device for cutting a filamentary bundle to discontinuous lengths, a disk having an axial channel for receiving the bundle connected to a radial channel for feeding the bundle outwardly therefrom, said disk being mounted for rotation about its axis on a shaft, a rotatable cam wheel, a pinion on said shaft for driving said cam wheel, a rotatably and reciprocably mounted support having a follower adapted to cooperate with the cam wheel, a knife secured on the support, resilient means for pressing the follower against the cam wheel and tending to swing the support with the knife in a direction to bring it into effective relationship with the disk, a stationary cam, a follower secured to said knife support and arranged to cooperate with the stationary cam to cause the knife to alternately swing into and out of contact with the disk simultaneously with the reciprocation of the knife by the cam wheel respectively into and out of the path of the filamentary bundle extending outwardly from the disk.

CARL A. CASTELLAN.